United States Patent
Huan

(10) Patent No.: US 8,233,877 B2
(45) Date of Patent: Jul. 31, 2012

(54) DISCONTINUOUS RECEPTION OF BURSTS FOR VOICE CALLS

(75) Inventor: Hong Xin George Huan, Chapel Hill, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1148 days.

(21) Appl. No.: 12/100,110

(22) Filed: Apr. 9, 2008

(65) Prior Publication Data

US 2009/0258664 A1 Oct. 15, 2009

(51) Int. Cl.
*H04W 52/44* (2009.01)
(52) U.S. Cl. .................................. 455/343.3; 455/574
(58) Field of Classification Search .................. None
See application file for complete search history.

(56) References Cited

U.S. PATENT DOCUMENTS

| | | |
|---|---|---|
| 5,790,941 A | 8/1998 | Peponides |
| 6,381,451 B1 * | 4/2002 | Parisel et al. ............... 455/343.2 |
| 6,463,050 B1 | 10/2002 | Nagashima |
| 6,473,601 B1 | 10/2002 | Oda |
| 2003/0086381 A1 | 5/2003 | Terry et al. |
| 2003/0135772 A1 | 7/2003 | Haulk et al. |
| 2003/0236077 A1 | 12/2003 | Sivard |
| 2005/0037795 A1 | 2/2005 | Aaltonen et al. |
| 2008/0107056 A1 * | 5/2008 | Choi et al. ...................... 370/311 |

FOREIGN PATENT DOCUMENTS

| | | |
|---|---|---|
| EP | 1804387 A1 | 7/2007 |
| WO | 99/10995 A1 | 3/1999 |
| WO | 2007/148175 A1 | 12/2007 |

OTHER PUBLICATIONS

3GPP TS 46.031, V6,0.0 (Dec. 2004). 3rd Generation Partnership Project; Technical Specification Group Services and System Aspects; Full rate speech; Discontinuous Transmission (DTX); for full rate speech traffic channels (Release 6).
3GPP TS 46.081, V6.0.0 (Dec. 2004). 3rd Generation Partnership Project; Technical Specification Group Services and System Aspects; Discontinuous Transmission (DTX) for Enhanced Full Rate (EFC) speech traffic channels (Release 6).
3GPP TS 430.13, V6.0.0 (Jan. 2005). 3rd Generation Partnership Project; Technical Specification Group GSM/EDGE; Radio Access Network; Discontinuous Reception (DRX) in the GSM system (Release 6).

* cited by examiner

*Primary Examiner* — Philip Sobutka
(74) *Attorney, Agent, or Firm* — Coats & Bennett, P.L.L.C.

(57) ABSTRACT

A mobile terminal capable of operating in a Discontinuous Transmission mode during an active voice call with a remote party is also capable of operating in a Discontinuous Reception mode during the same active voice call. Particularly, a receiving mobile terminal monitors when the remote party stops transmitting speech during the active voice call. If there are no speech signals to receive, the mobile terminal switches it's receiver "off" for selected receive time slots to save battery power.

25 Claims, 12 Drawing Sheets

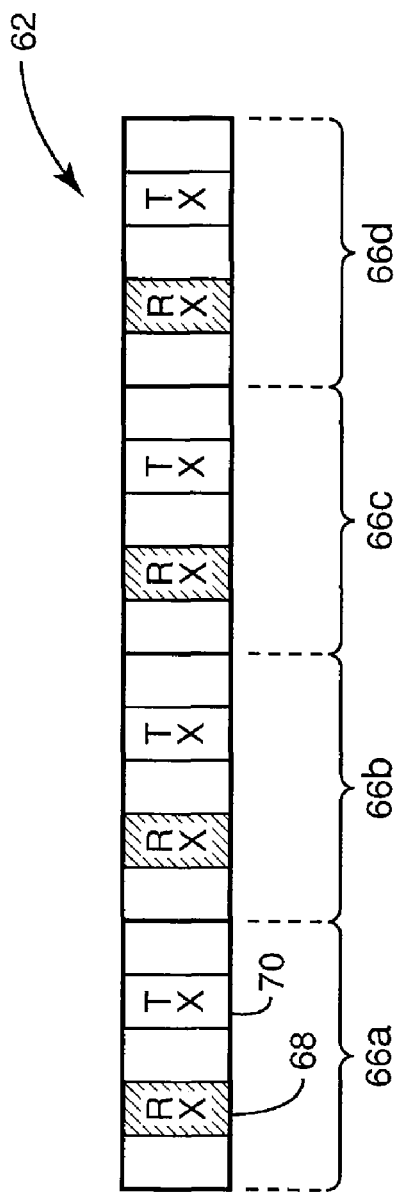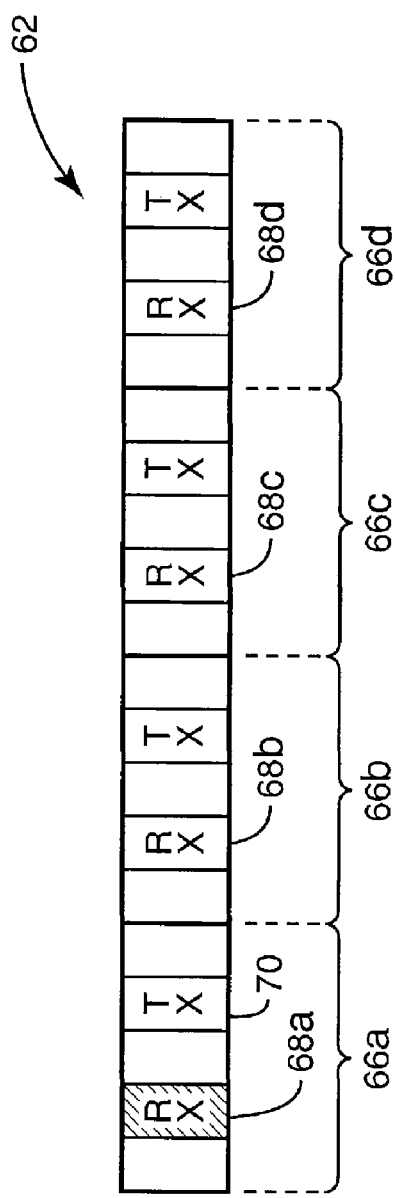

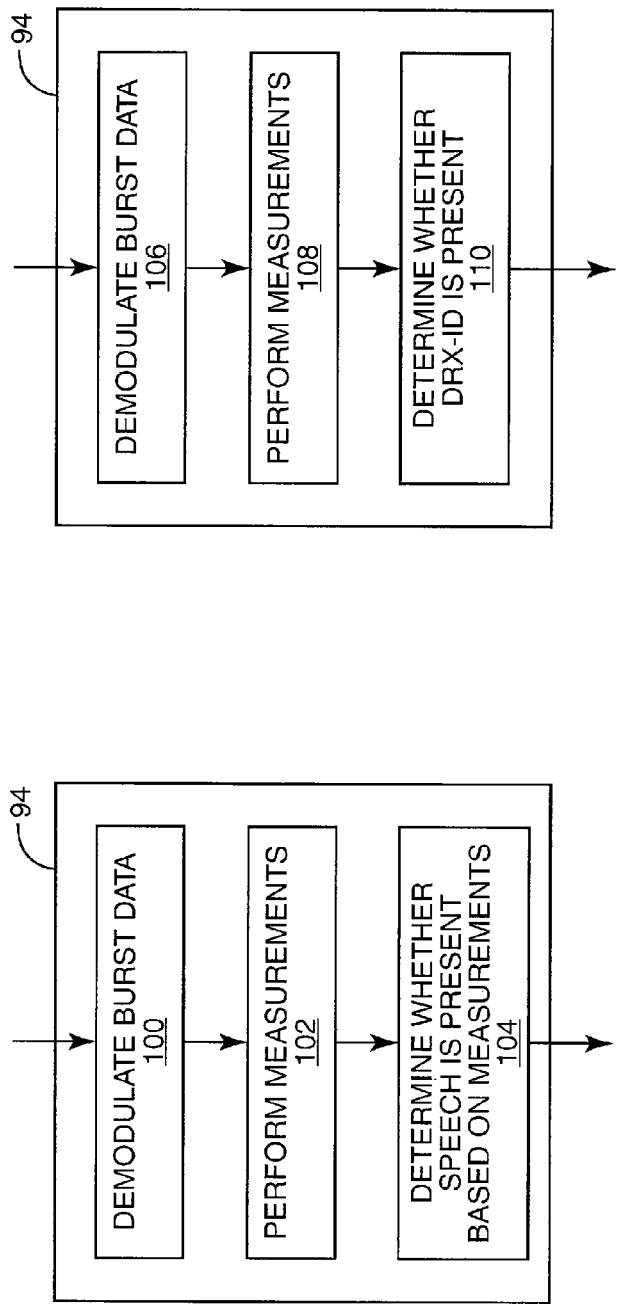
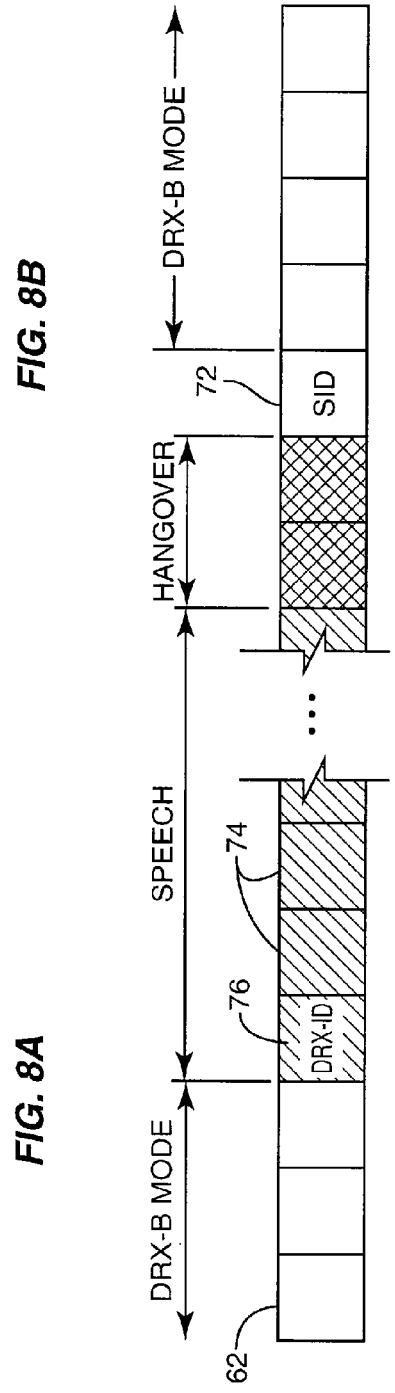
FIG. 8B
FIG. 8C
FIG. 8A

DISCONTINUOUS RECEPTION OF BURSTS FOR VOICE CALLS

TECHNICAL FIELD

The present invention relates generally to wireless communication devices, and particularly to wireless communication devices configured to operate in a Discontinuous Transmission (DTX) mode.

BACKGROUND

Generally, human beings do not speak and listen at the same time. This is especially true for humans engaged in a two-way voice conversation over a telephone. Historically, this was often problematic for wireless communication devices that employed a rechargeable battery as a power source. Particularly, the transmitter and the receiver of a user's device remained on throughout a two-way voice conversation. Thus, both would draw power from the battery even though a user would either speak (i.e., transmit) or listen (i.e., receive). The increased power draw required users to recharge their batteries more often thereby decreasing talk time. In addition, keeping the transmitter on during the voice call sometimes undesirably interfered with nearby receivers.

To address these types of situations, the 3$^{rd}$ Generation Partnership Project (3GPP) introduced sets of specifications defining a feature called Discontinuous Transmission (DTX) mode. Generally, with DTX mode, a wireless communication device turns it's transmitter off when the user does not speak into the microphone during an active voice call. Turning the transmitter off saves battery power and reduces the undesirable effects of transmitter interference. The DTX mode is well-known, and defined for both full rate speech channels and for enhanced full rate speech channels. For full-rate speech channels, the DTX mode is defined in 3GPP TS 46.031 (V6.0.0) entitled "Discontinuous Transmission (DTX) for full rate speech traffic channels (Release 6)," and dated December 2004. For enhanced full-rate speech channels, the DTX mode is defined in 3GPP TS 46.081 (V6.0.0) entitled "Discontinuous Transmission (DTX) for Enhanced Full Rate (EFR) speech traffic channels (Release 6)," and dated December 2004.

The 3GPP also defined a similar feature to control the receiver. Specifically, the Discontinuous Receiver (DRX) feature turns off a device's receiver while the device is in an idle mode. While idle, the receiver is turned on only during predetermined time slots to allow it to listen to a paging channel. If the device receives a page, the receiver is turned on to receive voice and data over a traffic channel; otherwise, the receiver is once again turned off to conserve power resources. The DRX mode is defined in 3GPP TS 43.013 (V6.0.0) entitled "Discontinuous Reception (DRX) in the GSM system; (Release 6)," and dated December 2005.

The DTX mode saves power because it turns the transmitter off when a user is listening. Similarly, the DRX mode saves power because it turns off the receiver when the device is in an idle mode. However, once the user engages in a two-way conversation, the receiver remains turned on even when the user is speaking. There are no analogous power savings while the user is engaged in an active call.

SUMMARY

The present invention provides new operating mode for a wireless communication device. Particularly, this operating mode is referred to herein as a Discontinuous Reception of Bursts (DRX-B) mode. With the DRX-B mode, a wireless communication device switches its receiver "off" during an active voice call with a remote party when there are no speech signals to receive. This may occur, for example, whenever a user is transmitting to the remote party, or whenever the remote party is silent. The wireless communication device will exit the DRX-B mode by switching its receiver "on" when the remote party begins speaking again. This operating mode prevents the receiver from unnecessarily using battery power when there are no signals to receive.

A transmitting mobile terminal may also assist a receiving mobile terminal to determine whether to enter the DRX-B mode. In one embodiment, an identifier indicating the beginning of speech frames is sent to the receiving mobile terminal. Upon receipt, the receiving mobile terminal enables the receiver to receive the speech frames. To determine if the transmitting device has stopped transmitting speech signals, the receiving device performs measurements on the identifier, and then compares those measurements to measurements performed on the received signal frames. If the comparison reveals that the transmitting device has stopped transmitting speech, the receiving mobile terminal enters the DRX-B mode.

BRIEF DESCRIPTION OF THE DRAWINGS

FIG. 4A illustrates an exemplary structure for a frame received by a mobile terminal operating in a DTX mode.

FIG. 4B illustrates an exemplary structure for a frame transmitted or received by a mobile terminal operating in a Discontinuous Reception of Bursts (DRX-B) mode according to one embodiment of the present invention.

FIG. 8A is a flow chart illustrating a method of detecting speech while in the DRX-B mode according to one embodiment of the present invention.

FIG. 8B is a flow chart illustrating another method of detecting speech while in the DRX-B mode according to another embodiment of the present invention.

FIG. 8C is a perspective view of a traffic channel structure having a DRX-B identifier (DRX-B ID) according to one embodiment of the present invention.

DETAILED DESCRIPTION

The present invention provides a wireless communications device that operates in both a normal receive mode and a Discontinuous Reception of Bursts (DRX-B) mode during an active voice call with a remote party. In the normal receive mode, the device switches its receiver "on" for all receive burst slots when there are speech signals to receive (i.e., when a user is listening to a remote party speak). When the device detects the absence of speech, the device switches to the DRX-B mode. In the DRX-B mode, the device switches its receiver "off" for selected receive bursts when there are no speech signals to receive (i.e., the remote party is not speaking). In one exemplary embodiment, the device switches its receiver on for the first frame in each radio. If speech is detected, the device switches back to the normal receive mode. If no speech is detected, the device remains in the DRX-B mode and leaves the receiver off for the remaining frames in the radio block. Thus, during the course of an active voice call, the device switches the receiver between operating in a normal receive mode to receive speech signals, and a DRX-B mode when there are no speech signals to receive. Turning the receiver "off" for selected receive burst slots during an active voice call prevents the receiver from unnecessarily using battery power during the voice call thereby saving resources.

A transmitting device may assist a receiving device in determining whether to enter the DRX-B mode by sending indicators to the receiving device to signal the beginning and the end of transmitted speech signals. For example, the transmitting device may transmit an identifier with the speech signals that indicates the beginning of speech. Upon receipt of the identifier, the receiving device switches the receiver "on" (i.e., enters the normal receive mode) to receive speech signals in the receive bursts. The transmitting device may also transmit a descriptor with the speech signals to signal the end of the speech signals. Upon receipt of the descriptor, the receiving device switches the receiver "off" for selected receive burst slots (i.e., enters the DRX-B mode).

Figure 1:
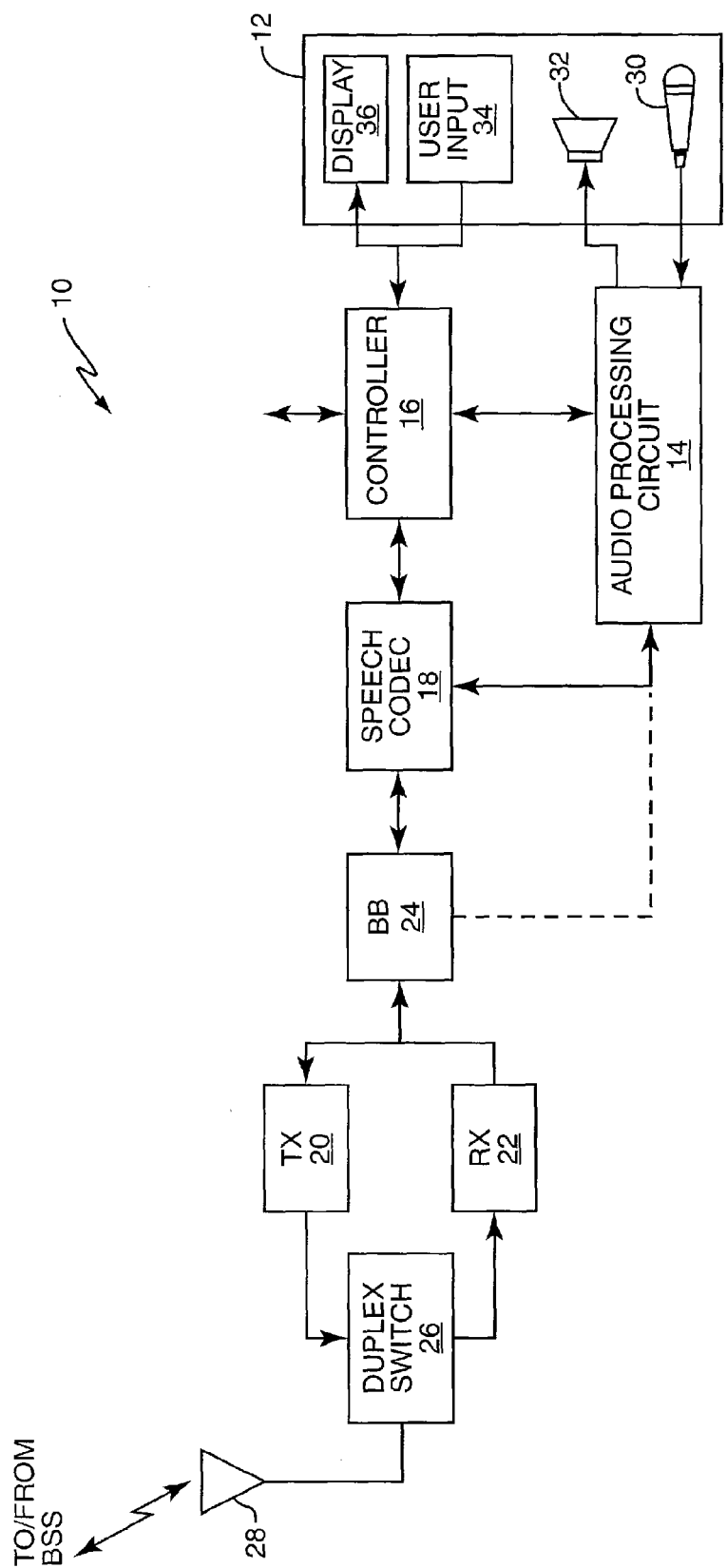
FIG. 1 is a block diagram illustrating some of the component parts of a wireless communication device configured according to one embodiment of the present invention.

FIG. 1 illustrates some of the component parts of a mobile terminal 10 configured to operate according to one embodiment of the present invention. It should be understood that as used herein, the term "mobile terminal" connotes a broad array of device types, or a mix of such device types. For example, the mobile terminal 10 illustrated in the figures may comprise a cellular radiotelephone, a Portable Digital Assistant (PDA), a palmtop or laptop computer or a communication module included within a computer, a satellite phone, or other type of wireless communication device. It also should be understood that the architectural details of the wireless communications device 10 and the particular circuit elements incorporated therein may vary according to its intended use. Additionally, the illustrated mobile terminal 10 comprises a device capable of operating in a Discontinuous Transmission (DTX) mode. As is known in the art, DTX mode is an operating mode in which a mobile terminal conserves battery power by turning it's transmitter off when the user is listening to a remote party during active call.

Mobile terminal 10 comprises a user interface (UI) 12, an audio processing circuit 14, a system controller 16, a speech codec 18, a transmitter circuit 20, a receiver circuit 22, baseband control circuit(s) 24, a switch/duplexer 26, and a receive/transmit antenna 28. The UI 12 includes a microphone 30, a speaker 32, one or more user input devices 34, and a display 36. Microphone 30 converts the user's speech into electrical audio signals and speaker 32 converts audio signals into audible signals that can be heard by the user. The audio processing circuit 14 provides basic analog output signals to speaker 32 and accepts analog audio inputs from microphone 30. User input devices 34 receive user input, while display 36 allows the user to view information.

The antenna 28 allows the transmitter 20 to transmit speech signals uttered by a user of device 10 over any of a variety of well-known connections, such as circuit-switched and packet-switched connections. The antenna 28 also allows the receiver 22 to receive speech signals uttered by a remote party over the connections. The switch/duplexer 26 connects the transmitter 20 or the receiver 22 to the antenna 28 accordingly. It should be understood that the transmitter 20 and the receiver 22 are illustrated herein as separate components; however, this is for purposes of discussion only. Some mobile terminals 10 may integrate the transmitter and receiver 20, 22 into a single component referred to herein as a transceiver.

Generally, a received signal passes from the receiver 22 to the baseband control circuit 24 for demodulation and decoding, and then to the speech codec 18 for speech decoding. In some embodiments, the baseband control circuit 24 may also perform the speech decoding on the received signals (and/or speech encoding on transmitted signals). The system controller 16, which controls the operation of the wireless communications device 10, may receive the decoded signal, or control the baseband control circuit 24 to send the decoded signal to the audio processing circuit 14 for further processing. The audio processing circuit 14 converts the decoded data in the signal from a digital signal to an analog signal for rendering as audible sound through the speaker 32.

For transmitted signals, the speech codec 18 speech encodes analog voice signals detected at microphone 30 and then passes the encoded speech to the baseband control circuit 24. The baseband control circuit 24 converts the analog speech signals into digital signals, and encodes the digital signals into data using the appropriate protocol for the communication network. The baseband control circuit 24 then performs encoding and modulation as is known in the art. The modulated signal is then sent to the transmitter 20 for transmission to the intended remote party.

Figure 2:
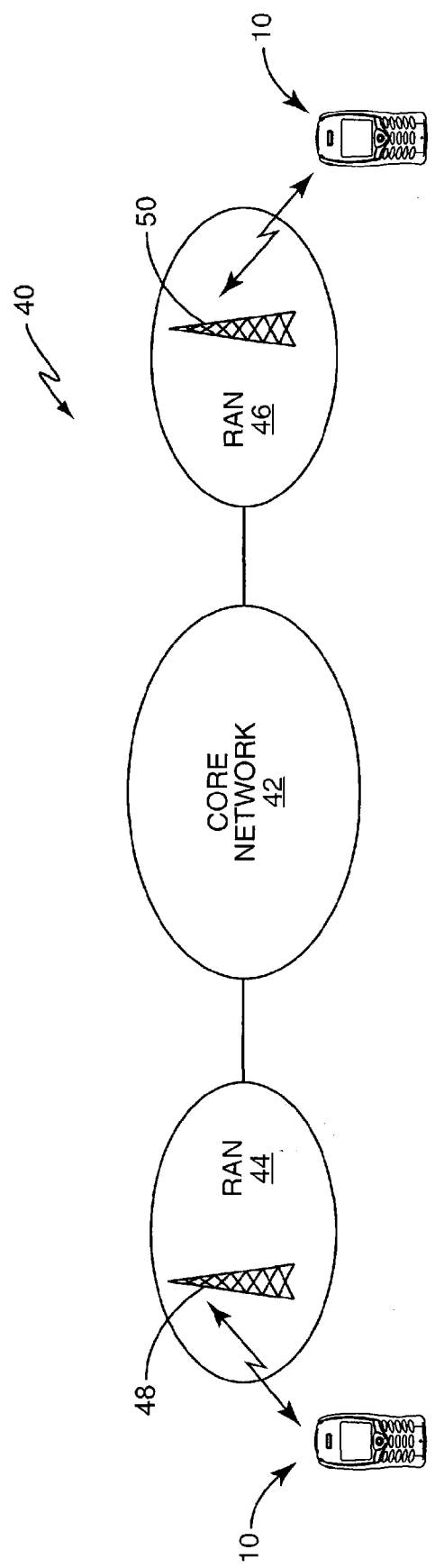
FIG. 2 is a block diagram illustrating a communication network suitable for use with a wireless communication device configured according to one embodiment of the present invention.

FIG. 2 illustrates an exemplary communications network 10 that allows parties using mobile terminals 10 to communicate with each other over a voice call. The network components and their interactions are well documented and understood by those in the art. Therefore, only a brief description of their functionality and their interaction is included herein for context.

Network 10 facilitates voice and/or data communications between two or more parties having a mobile terminal 10, and includes a core network (CN) 42 that interconnects a pair of Radio Access Networks (RANs) 44, 46. The RANs 44, 46 support radio communications with mobile terminals 10 over an air interface using one or more base stations 48, 50. The RANs 44, 46 may comprise, for example, a Global System for Mobile communications (GSM) network or other radio access network. The CN 42 may be a circuit-switched network or a packet-switched network, and provides a connection between the RANs 44, 46 and to external networks such as the Public Switched Telephone Network (PSTN) (not shown) and/or an Integrated Digital Services Network (ISDN) (not shown) for circuit-switched services, such as voice services, fax services, or other data services.

Figure 3:
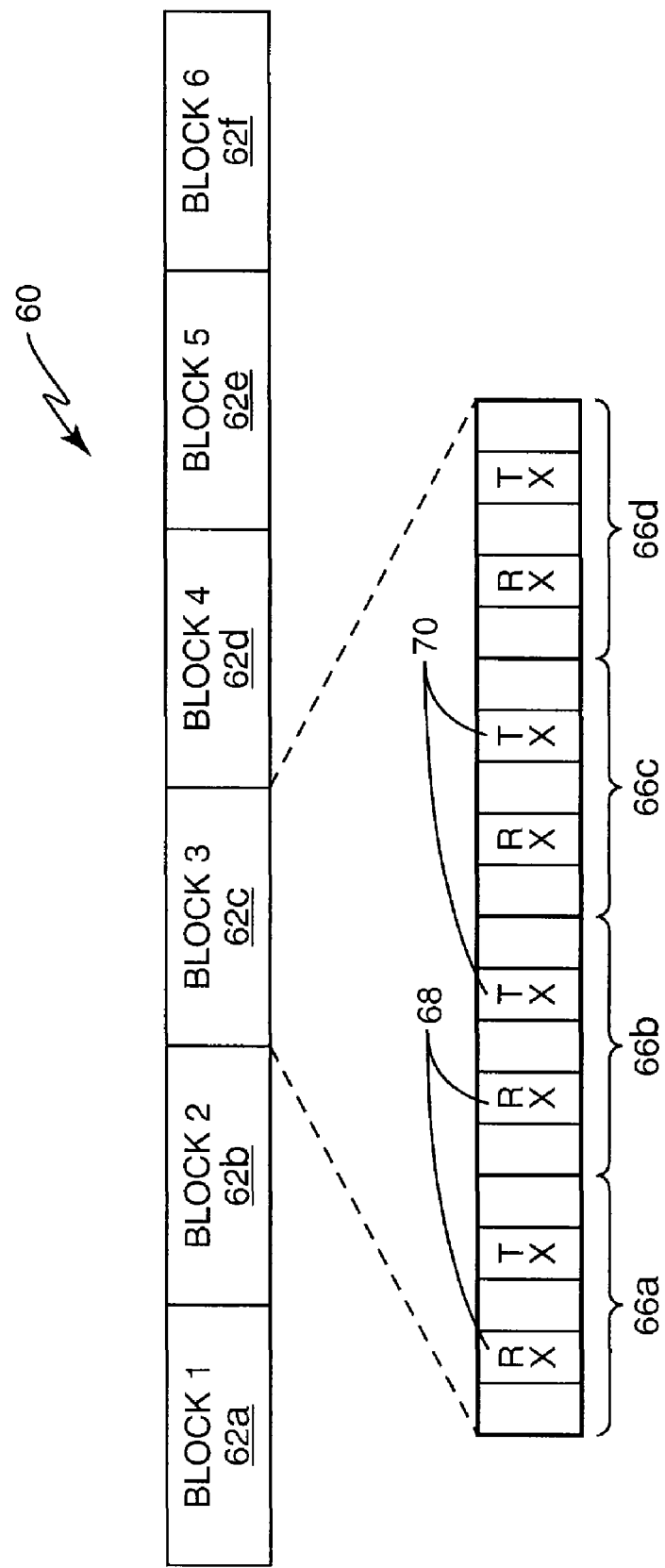
FIG. 3 illustrates an exemplary structure of a traffic channel suitable for use with one embodiment of the present invention.

Generally, when two parties wish to speak with each other, a traffic channel is established to carry the voice traffic. With GSM networks, such as network 10, a voice call uses a 26-multiframe structure for the traffic channel. FIG. 3 illustrates a 26-multiframe structure 60 used for GSM full rate speech. As seen in FIG. 3, each 26-multiframe 60 comprises six (6) radio blocks 62. Each block 62 further comprises four (4) Time Division Multiple Access (TDMA) frames 66. During a GSM full rate voice call, each TDMA frame 66 will include a Receive Burst (RX burst) time slot 68 for receiving signals from a remote party, and a Transmit Burst (TX burst) time slot 70 for transmitting signals to the remote party.

As stated above, mobile terminal 10 is capable of operating in a DTX mode on a GSM voice call. FIG. 4A illustrates a structure of a frame received by mobile terminal 10 operating in a DTX mode during such a call. As seen in FIG. 4A, the mobile terminal 10 switches the transmitter 20 "off" when there is no speech detected at the transmitting party's microphone 30. Thus, there is no data transmitted to the remote party in any of the TX bursts 70 of the frames 66. The receive circuit 22, however, is switched "on" to allow the mobile terminal 10 to receive signals in each of the RX bursts 68. This saves the battery power of the receiving mobile terminal 10 and reduces the interference with other nearby transmitting devices.

Conventional mobile terminals can also enter a Discontinuous Reception (DRX) mode in which the receiver is turned "off." However, conventional DRX mode is allowed only during idle mode when the mobile terminal is not engaged in an active voice call. There is no analogous mechanism that allows a mobile terminal 10 to control it's receiver 22 during an active voice call in a similar manner. Particularly, when a user is speaking to a remote party, or when the remote party is silent (i.e., neither party is speaking), there is no speech to receive. Therefore, there is no need to have the receiver 22 switched "on" for each RX burst 68 because this simply uses battery power. The present invention addresses these situations by defining a new Discontinuous Reception of Bursts (DRX-B) mode in which the mobile terminal 10 switches it's receive 22 "off" for selected RX bursts 68 when there is no speech to receive.

According to the present invention, the mobile terminal 10 operates in both a normal receive mode and a DRX-B mode while engaged in an active voice call with a remote party. The mobile terminal 10 enters the normal receive mode when the user is listening to the remote party speak. Particularly, the mobile terminal 10 turns its receiver "on" for all receive bursts 68 in each frame 66 of the received radio blocks 62 to receive speech signals transmitted by the remote party (e.g., FIG. 4A). The mobile terminal enters the DRX-B mode when there are no speech signals to receive, such as when the remote party has ceased speaking. In the DRX-B mode, the mobile terminal turns its receiver "on" for the first receive burst slot of a received radio block to detect speech signals. If the mobile terminal 10 does not detect speech signals, the mobile terminal 10 turns its receiver "off" for the remaining receive burst slots in the received radio block. If the mobile terminal does detect speech signals, the mobile terminal 10 switches back to operating in the normal receive mode.

FIG. 4B illustrates a structure of a TDMA frame transmitted (or received) by a mobile terminal 10 operating in a DRX-B mode according to one embodiment of the present invention. Specifically, while a user is on an active voice call with a remote party, the user's mobile terminal 10 switches its receiver 22 "on" for a first RX burst 68a in a first TDMA frame 66a. This allows the mobile terminal 10 to detect speech signals transmitted by the remote party. Provided there are no speech signals to receive, the mobile terminal 10 will switch the receiver 22 "off" for the remainder of the RX bursts 68b-68d in the remaining TDMA frames 66b-66d of the received radio block 62.

The DRX-B mode of the present invention provides the mobile terminal 10 with additional power savings. It increases the talk time of the mobile terminal, which is an important benchmark for manufacturers, and requires no changes in the existing radio infrastructure. The only change required would be to the GSM software in the mobile terminal 10. Specifically, the changes would configure the controller 16 to switch the receiver 22 on and off at the appropriate times during an active voice call to enter and leave the DRX-B mode. Additionally, turning the receiver 22 off reduces the chance that the mobile terminal 10 will incorrectly decode a DTX frame as a speech frame.

Figure 5:
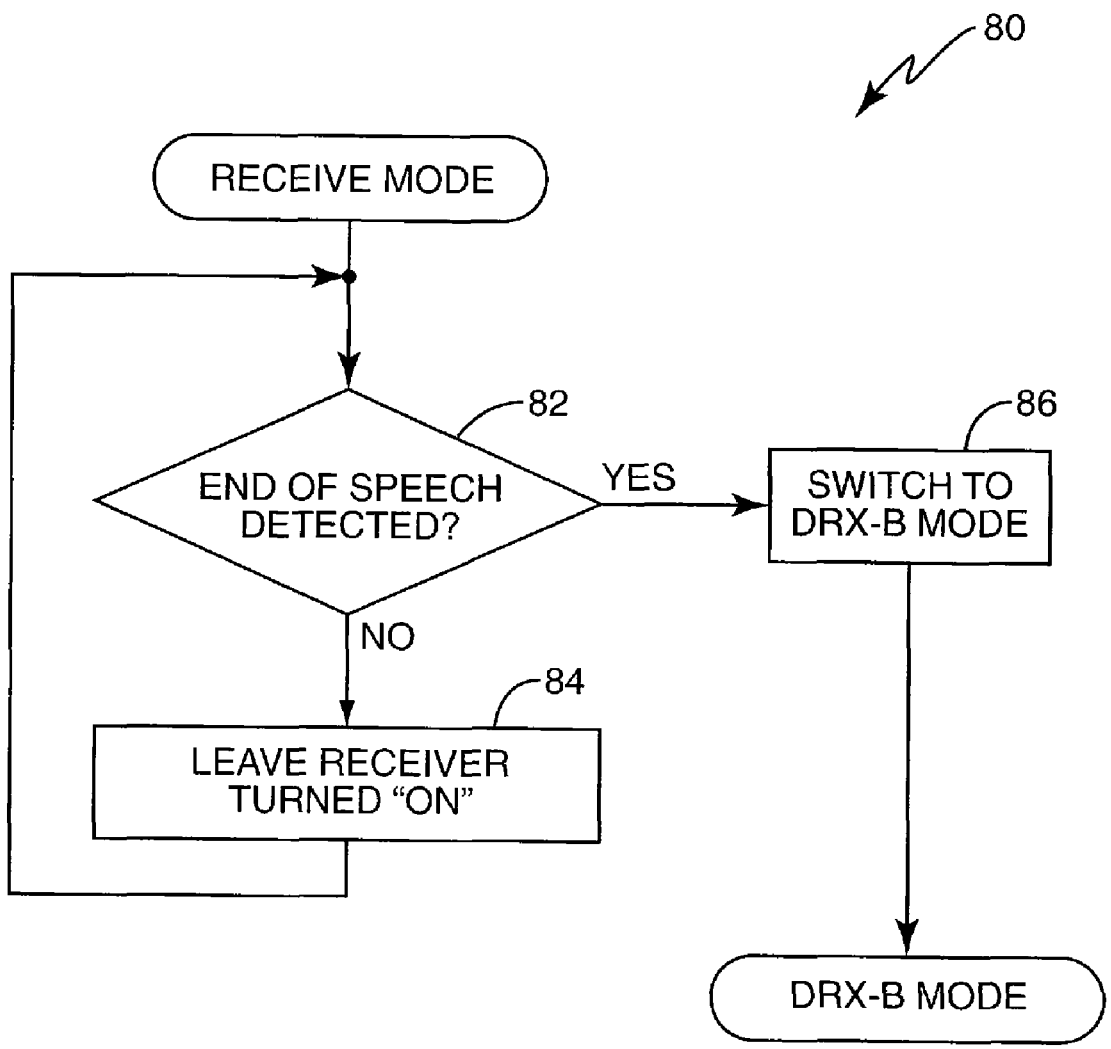
FIG. 5 is a flow diagram illustrating a wireless communication device operating in a normal receive mode according to one embodiment of the present invention.

FIG. 5 illustrates operation of the mobile terminal 10 in a normal receive mode according to one embodiment of the present invention. While in the normal receive mode of operation illustrated generally by the numeral 80, mobile terminal 10 monitors the received radio blocks 62. When the mobile terminal 10 detects speech signals (box 82), the mobile terminal 10 remains in the normal receive mode by leaving the receiver 22 turned "on" for all the receive bursts 68 in each frame 66 of the radio blocks 62. When the mobile terminal 10 detects the end of the speech signals (box 82), however, the mobile terminal 10 disables the normal receive mode and switches to the DRX-B mode (box 86).

Figure 6:
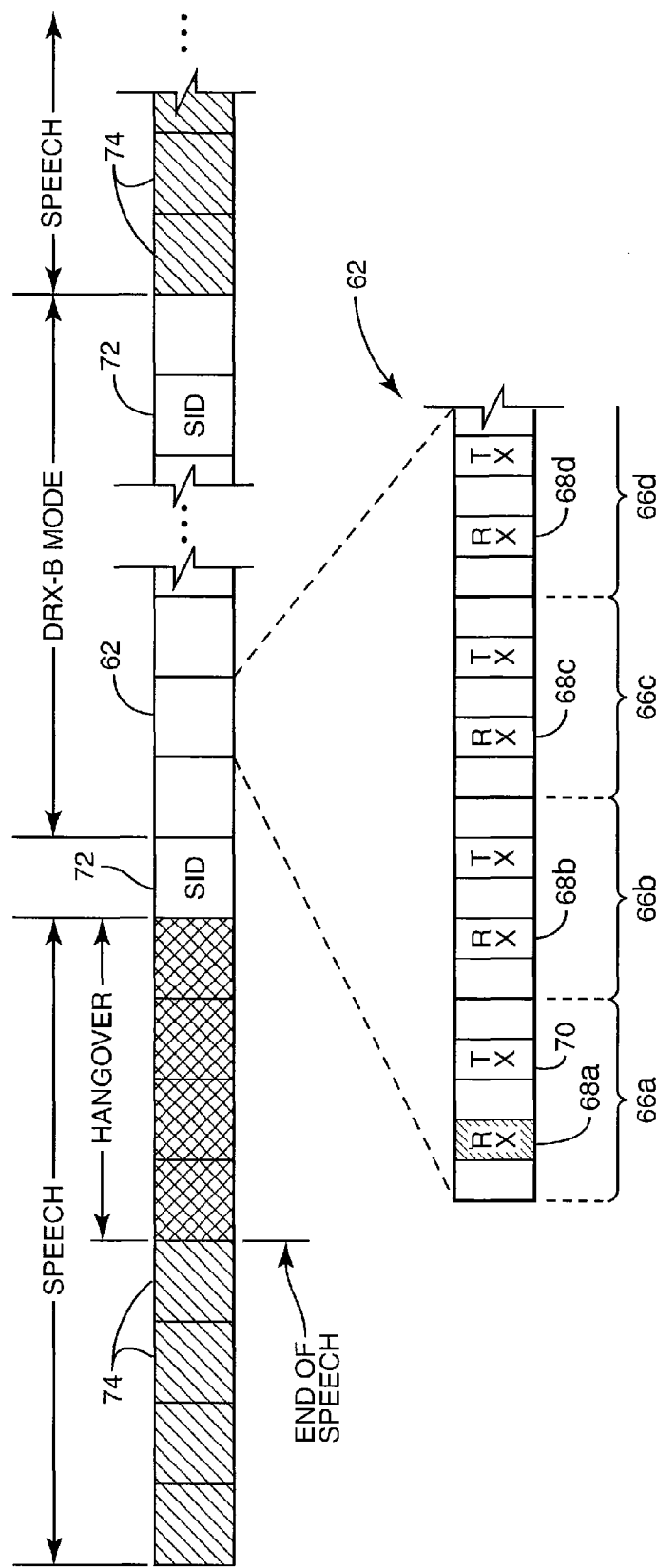
FIG. 6 illustrates a structure of a traffic channel showing a frame according to one embodiment of the present invention.

Detecting the end of the speech signals may be accomplished using any means known in the art. In one embodiment, seen in FIG. 6, the mobile terminal 10 will enter the DRX-B mode upon detecting a Silence Insertion Descriptor (SID) frame 72. As is known in the art, the SID frame 72 is usually generated by a transmitter for insertion into the radio blocks 62 after the end of the speech blocks 74 and the end of a "hangover" period. Conventionally, the receiving mobile terminal uses the SID frame 72 to generate comfort noise. With the present invention, however, the controller 16 invokes the DRX-B mode in the mobile terminal 10 when it detects the SID frame 72. In other embodiments, a voice activity detector (VAD) at the receiver can be used to detect the end of speech.

Figure 7:
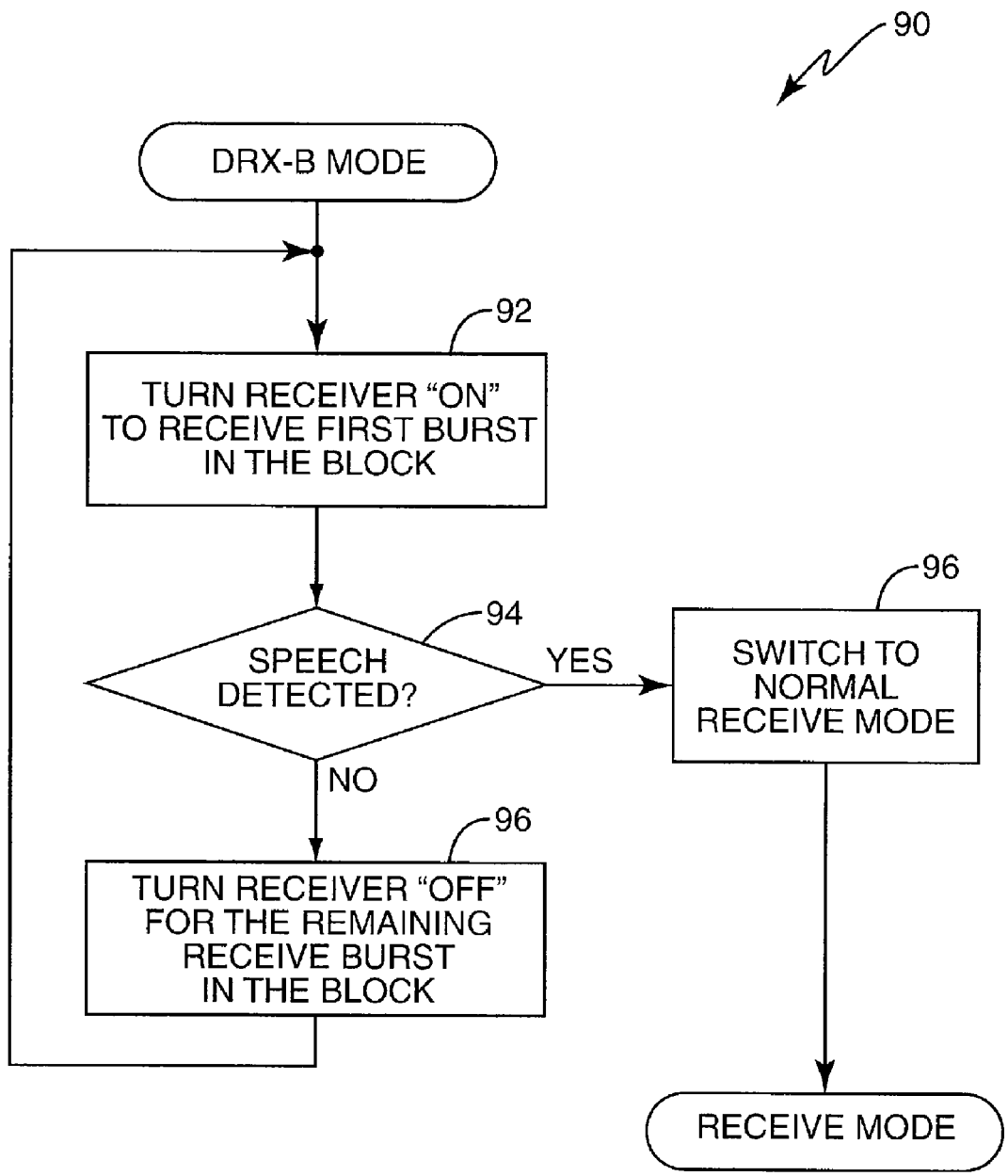
FIG. 7 is a flow diagram illustrating a wireless communication device operating in a DRX-B mode according to one embodiment of the present invention.

FIG. 7 illustrates exemplary operation of the mobile terminal 10 in the DRX-B mode according to one embodiment of the present invention. While in the DRX-B mode of operation indicated generally by the numeral 90, the mobile terminal 10 turns the receiver 22 "on" for the first receive burst 68a of the first frame 66 of each received radio block 62 (box 92). This allows the mobile terminal 10 to detect the start of speech (box 94) while it is in the DRX-B mode. If no speech is detected, the mobile terminal 10 turns the receiver "off" for the remaining receive bursts 68b-68d for the remainder of the radio block 62 (box 96). If speech is detected, however, the mobile terminal 10 disables the DRX-B mode and switches back to operating in the normal receive mode (box 98) as previously described.

The present invention may detect the beginning of transmitted speech blocks 74 in any of a variety of ways. FIG. 8A illustrates one exemplary method 94 for detecting the end of speech at the receiver. As shown in FIG. 8A, the controller 16 detects speech based on measurements, such as power measurements, performed on the received data. With this embodiment, the controller 16 performs the measurements at the burst level rather than at a block level, as is conventional. The controller 16 demodulates the data received in the receive burst 68a (box 100) and performs burst measurements (box 102). The burst level measurements may measure any characteristic known in the art, such as frequency and timing errors, for example. The controller 16 may then determine whether the mobile terminal 22 is receiving speech blocks 74 from the remote party (box 104). If the burst level measurements indicate that speech is being received, the controller 16 will not disable the receiver 22, but instead, will leave the receiver 22 turned "on." If the burst measurements indicate that the speech is not being received, the controller 16 generates a control signal to switch the receiver 22 "off" for the remaining RX bursts 68b-68d in the remaining TDMA frames 66b-66d of a received radio block 62.

In some cases, the burst measurements by themselves may not provide a reliable determination of the existence of speech blocks 74. For example, while frequency and timing errors can indicate the presence of speech data in a given RX burst, they are less reliable in conditions where high levels of interference are present. Therefore, in another embodiment seen in FIGS. 8B and 8C, a transmitting mobile terminal 10 will generate a DRX-B Identifier (DRX-B ID) frame 76 and send it to the receiving mobile terminal 10 operating in the DRX-B mode to increase the reliability of the burst level speech detection at the receiving mobile terminal 10.

FIG. 8B illustrates an alternative method 94 for detecting the start of speech at the receiver. As seen in FIG. 8B, the mobile terminal 10 demodulates the burst data received in RX burst 68a (box 106) and performs the burst level measurements as previously described (box 108). The controller 16 then determines whether the received burst 68a contained a DRX-B ID frame 76 (FIG. 8C) (box 110). If the burst level measurements indicate that a DRX-B ID frame 76 is present, the controller 16 can determine that speech blocks 74 are being received and turn the receiver 22 "on." If the burst measurements indicate that a DRX-B ID frame 76 is not present, the controller 16 can determine that no speech blocks 74 are being received, and generate a control signal to switch the receiver 22 "off" for the remaining RX bursts 68b-68d of a received radio block 62. As previously described, the mobile terminal 10 will disable the normal receive mode and enter the DRX-B mode upon detecting the SID frame 72.

A transmitting mobile terminal 10 generates a DRX-B ID whenever it first detects speech that will be transmitted. For example, controller 16 may generate the DRX-B ID when it first detects speech at microphone 30. In one embodiment, controller 16 generates the DRX-B ID by concatenating an M-bit value N times. The mobile terminal 10 places the DRX-B ID into a DRX-B ID frame 76, which is 57-bits in length, to mark the beginning of the speech blocks 74 and transmits it to the receiving mobile terminal 10.

Figure 9:
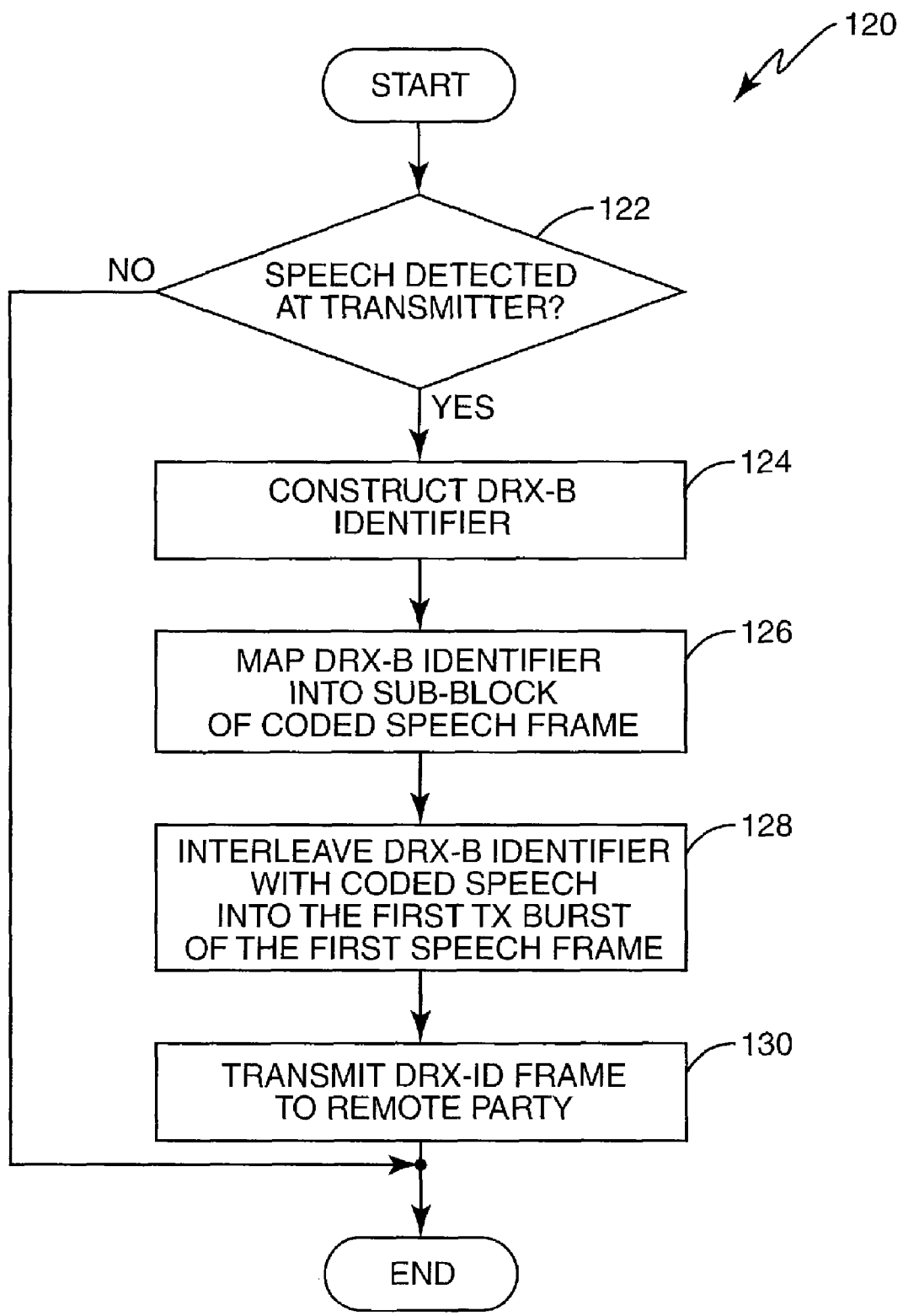
FIG. 9 is a flow diagram illustrating a method of generating a DRX-B ID according to one embodiment of the present invention.
Figure 10:
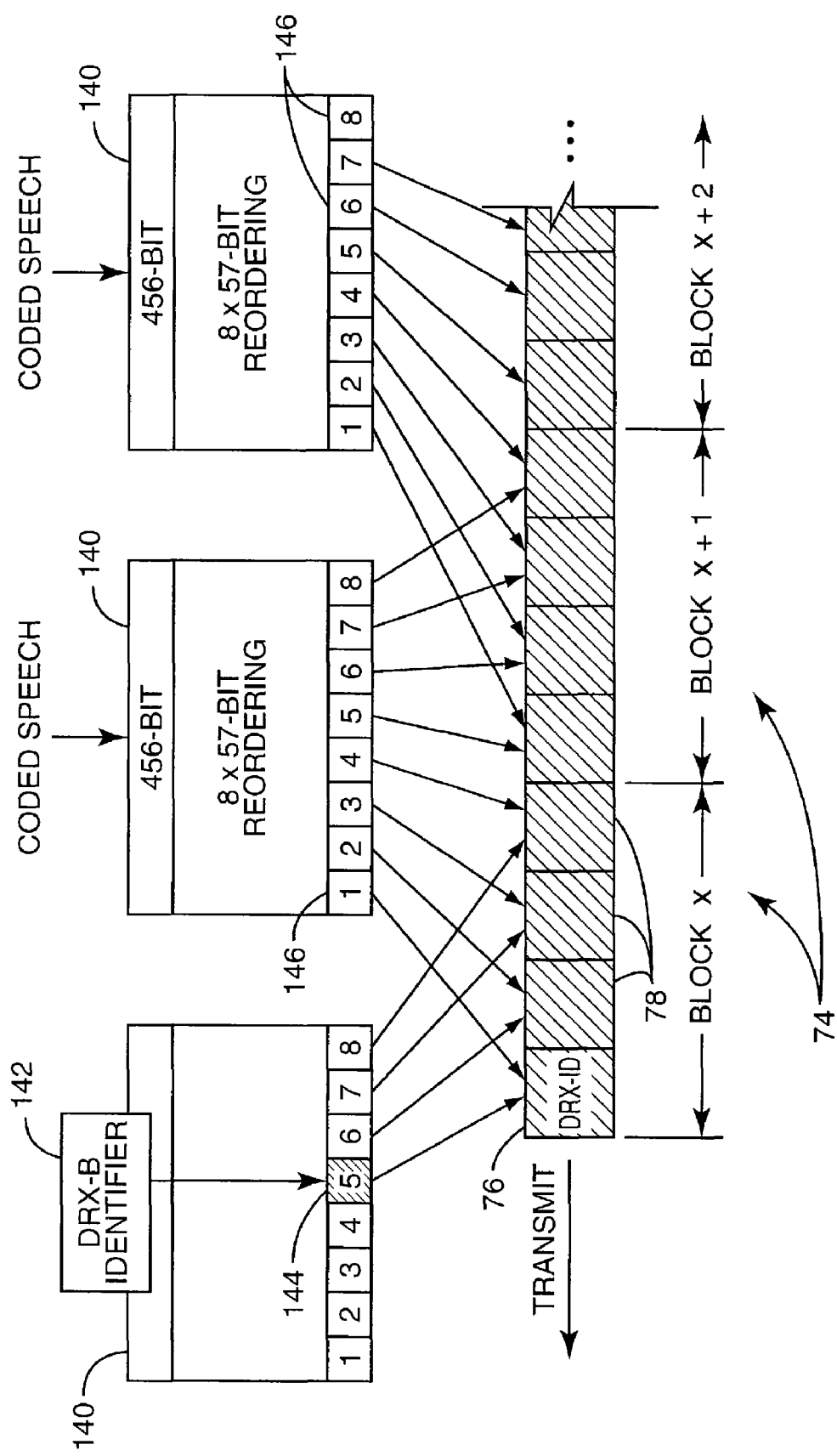
FIG. 10 is a perspective view illustrating how a DRX-B ID is constructed and sent to a remote party according to one embodiment of the present invention.

FIGS. 9 and 10 illustrate an exemplary method 120 by which a transmitting mobile terminal 10 may construct the DRX-B ID frame 76 and send it to the receiving mobile terminal 10. Particularly, the user's speech is encoded to form coded speech blocks 140. When the controller 16 at the transmitting mobile terminal 10 first detects a user's speech at microphone 30 (box 122), it generates a control signal to construct the DRX-B ID 142 (box 124). As previously stated, the controller 16 may generate the DRX-B ID 142 by repeating an M-bit value N times. The controller 16 then takes advantage of the speech interleaving function by mapping the DRX-B ID 142 into the fifth ($5^{th}$) sub-block 144 of a coded speech block 120 (box 126). The mapped DRX-B ID 142 is then interleaved with subsequent sub-blocks of encoded speech 146 carried by coded speech blocks 140 into the first TX burst 70 of the first TDMA frame of a first speech block 74 (box 128). As seen in FIG. 10, the first TDMA frame is the DRX-B ID frame 76, and carries both the DRX-B ID 142 and speech. The remaining frames 78 in the speech blocks 74 also carry speech. The speech blocks 74, including the DRX-B ID frame 76, are then transmitted to the receiving mobile terminal 10 (box 130).

Interleaving the DRX-B ID 142 with speech for transmission to the receiving mobile terminal 10 is beneficial because it negates the need to alter the existing frame structure, or to introduce new frames or TX bursts, simply to carry the DRX-B ID 142. Rather, the transmitting mobile terminal 10 can introduce the DRX-B ID 142 using the existing frame structure.

The previous embodiments discuss the present invention in terms of a GSM full rate speech mode. However, this is for illustrative purposes only. The present invention may also be employed with other GSM speech codecs including GSM Enhanced Full Rate and GSM Half Rate. Additionally, the present invention may be applied to non-GSM speech codecs such as an Adaptive Multi-Rate (AMR) Full Rate, AMR Half Rate, AMR-WB Full Rate, and AMR-WB Half Rate. AMR is a speech compression scheme used in some networks to encode voice data. AMR uses various techniques to optimize the quality and robustness of the voice data being transmitted over the network. AMR is defined in 3GPP TS 26.071 (V7.0.1) entitled "AMR speech CODEC; General description (Release 7)."

Figure 11:
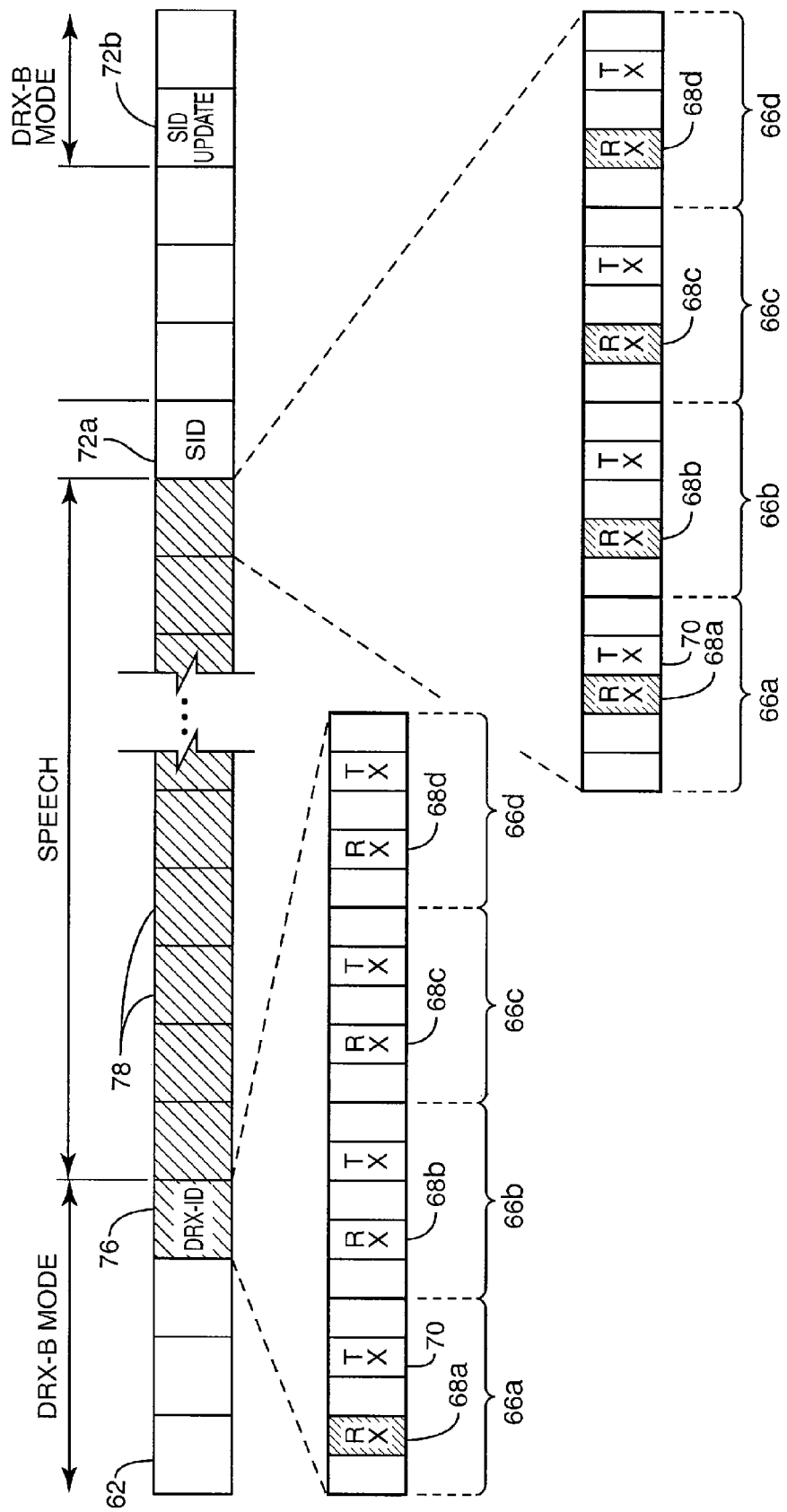
FIG. 11 is a perspective view illustrating the structure of a traffic channel according to another embodiment of the present invention.

Those skilled in the art will appreciate that there are differences between GSM codecs and AMR codecs. One difference shown in FIG. 11 is that AMR full rate uses the SID frames differently than does GSM full rate. Specifically, AMR full rate uses a first SID frame 72a to indicate the end of the speech signals during the active voice call, and sends the silence descriptor every eight (8) speech frames in a SID Update frame 72b. With AMR, the mobile terminal does not enter the DRX-B mode until receiving the SID Update frame 72b. As with GSM, the controller 16 switches the receiver 22 "on" for the first RX burst 68a of the first TDMA frame 66a upon receipt of the SID update frame 72b. The data in the RX burst 68a is demodulated, and measurements are performed to detect speech. As previously described, the mobile terminal 10 may evaluate the received frames at the burst level to determine whether speech is being received. If no speech is detected, the controller 16 at the receiving mobile terminal 10 will enter the DRX-B mode by switching the receiver 22 "off" for the $2^{nd}$, $3^{rd}$, and $4^{th}$ RX bursts 68b-68d in their corresponding frames 66b-66d.

Figure 12:
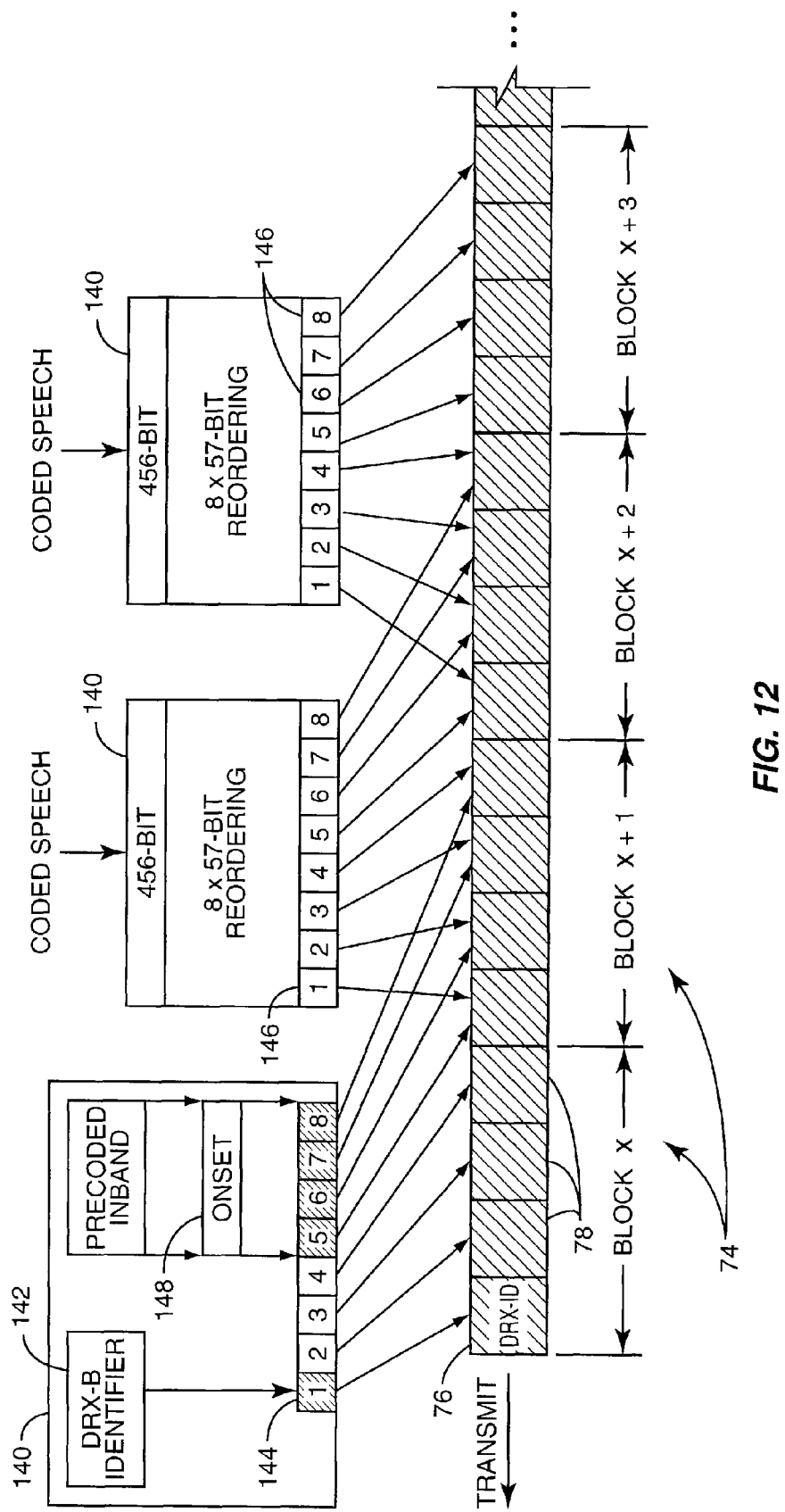
FIG. 12 is a perspective view illustrating how a DRX-B ID is constructed and sent to a remote party according to another embodiment of the present invention.

Another difference between GSM-based embodiments and AMR-based embodiments is in the placement and generation of the DRX-B ID 142. As seen in FIG. 12, AMR already uses an ONSET frame immediately ahead of the speech frames. Therefore, the present invention interleaves the DRX-B ID 142 into the first TDMA frame of block 74 just before the ONSET 148, and the encoded speech 140 into the subsequent frames 78. This allows the same burst-level speech detection as previously described without changing the format of the ONSET 148, but requires the additional transmission of the DRX-B ID frame 76.

In another embodiment, the DRX-B ID 142 may be combined with the ONSET 148. This would place the DRX-B ID 142 at a later sub-block, and thus, permit interleaving as previously described. However, while this approach might eliminate the need for the additional transmission of the DRX-B ID frame 76, it would also require changes to the ONSET format as prescribed by the 3GPP standard.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving signals during an active call, the method comprising:
   detecting an end of received speech during an active voice call;
   disabling a receiver for selected receive bursts during the active call responsive to detecting the end of the received speech;
   detecting a start of received speech during the active call by:
      enabling the receiver for a first receive burst to receive signals;
      decoding the received signals received in the first burst to produce decoded signals; and
      determining whether the decoded signals include an identifier transmitted by a remote party's device to indicate the start of speech signals; and
   switching the receiver on or off for subsequent receive bursts to receive the speech signals or not based on whether the identifier is present in the decoded signals.

2. The method of claim 1 wherein disabling a receiver for selected receive bursts during the active call comprises switching the receiver from a normal receive mode of operation to a discontinuous reception of bursts mode of operation if there are no speech signals being received.

3. The method of claim 2 wherein disabling a receiver for selected receive bursts during the active call comprises:
   turning the receiver on for a first frame in a radio block;
   determining whether the first frame contains speech; and
   if the first frame does not contain speech, turning the receiver off for one or more subsequent frames in the radio block.

4. The method of claim 3 further comprising switching from the discontinuous reception of bursts mode of operation to the normal receive mode of operation if the first frame in the radio block contains speech.

5. The method of claim 1 wherein detecting an end of received speech during an active voice call comprises detecting an indicator frame indicating that the remote party is not transmitting speech signals.

6. The method of claim 5 wherein the indicator frame comprises a Silence Insertion Descriptor frame, and wherein disabling the receiver for selected receive bursts during the active call comprises turning the receiver off for the selected receive bursts responsive to detecting the Silence Insertion Descriptor frame.

7. The method of claim 1 further comprising
   enabling the receiver for each of the receive burst slots during the active call responsive to detecting the start of the received speech.

8. The method of claim 7 wherein enabling the receiver for each of the receive burst slots during the active call comprises switching the receiver to a normal receive mode of operation if there are speech signals to be received.

9. The method of claim 1 wherein switching the receiver on or off for subsequent receive bursts comprises:
   switching the receiver on for subsequent receive bursts in a received radio block to receive the speech signals if the identifier is present; and
   switching the receiver off for the remaining receive bursts in the received radio block if the identifier is not present.

10. A wireless communication device comprising:
    a receiver configured to receive speech signals in a normal receive mode during an active voice call; and
    a controller configured to:
       detect an end of the received speech signals during the active voice call;
       switch the receiver to operate in a discontinuous reception of bursts mode during the active call responsive to detecting the end of the received speech signals;
       detect a start of received speech signals during the active call by:
          enabling the receiver for a first receive burst to receive signals;
          decoding the received signals received in the first burst to produce decoded signals; and
          determining whether the decoded signals include an identifier transmitted by a remote party's device to indicate the start of speech signals; and
       switch the receiver on or off for subsequent receive bursts based on whether the identifier is present in the decoded signals.

11. The device of claim 10 wherein the controller is configured to switch the receiver to a discontinuous reception of bursts mode of operation by:
    turning the receiver on for a first frame in a radio block;
    determining whether the first frame contains speech signals; and
    turning the receiver off for one or more subsequent frames in the radio block if the first frame does not contain speech signals.

12. The device of claim 11 wherein the controller is configured to switch the receiver from the discontinuous reception of bursts mode of operation to the normal receive mode of operation if the first frame in the radio block contains speech.

13. The device of claim 10 wherein the controller is configured to switch the receiver to the discontinuous reception of bursts mode of operation during the active voice call by turning the receiver off for selected receive bursts if there are no speech signals being received.

14. The device of claim 13 wherein the controller is configured to detect the end of the received speech signals during the active voice call by detecting a first predetermined frame indicating that a remote party is not transmitting speech signals.

15. The device of claim 10 wherein the controller is configured to
    switch the receiver back to the normal receive mode of operation responsive to detecting the start of the speech signals.

16. The device of claim 15 wherein the controller is configured to switch the receiver back to the normal receive mode of operation during the active call by turning the receiver on for each of the receive bursts in a received radio block.

17. The device of claim 10 wherein the controller is further configured to:
    switch the receiver on for subsequent receive bursts in a received radio block to receive the speech signals if the identifier is present in the decoded signals; and switch the receiver off for the remaining receive bursts in the radio block if the identifier is not present in the decoded signals.

18. A method of transmitting speech signals having control information during an active voice call, the method comprising:

generating an indicator indicating an end of speech blocks being transmitted to a remote device during an active voice call; and transmitting the indicator in a first radio block to switch the remote device to operate in a discontinuous reception of bursts mode of operation while engaged in the active voice call;

generating an identifier indicating a start of the speech blocks for transmission to the remote device; and interleaving the identifier with encoded speech into a first frame of a second radio block to indicate the start of the speech blocks to the remote party.

19. The method of claim 18 wherein the indicator comprises a silence descriptor.

20. The method of claim 18 wherein generating an identifier comprises concatenating an M-bit value N times to produce an identifier having a predetermined bit length responsive to detecting a user's speech.

21. The method of claim 18 further comprising mapping the identifier into a subblock of a first encoded signal block, and interleaving the subblock into a second radio block for transmission to the remote device.

22. A wireless communication device comprising:
a controller configured to:
generate an indicator indicating an end of speech blocks being transmitted to a remote device during an active voice call;
generate an identifier indicating a start of the speech blocks for transmission to the remote device; and
interleave the identifier with encoded speech into a first frame of a second radio block; and
a transmitter configured to:
transmit the indicator in a first radio block to switch the remote device to operate in a discontinuous reception of bursts mode of operation while engaged in the active voice call; and
transmit the identifier interleaved with the encoded speech in the first frame of the second radio block to indicate the start of the speech blocks to the remote party.

23. The device of claim 22 wherein the indicator comprises a silence descriptor.

24. The device of claim 22 wherein the controller is further configured to concatenate an M-bit value N times to produce the identifier having a predetermined bit length responsive to detecting a user's speech.

25. The device of claim 22 wherein the controller is further configured to map the identifier into a subblock of a first encoded signal block, and interleave the subblock into a second radio block for transmission to the remote device.

* * * * *